US011415290B2

(12) United States Patent
Iwasaki et al.

(10) Patent No.: US 11,415,290 B2
(45) Date of Patent: Aug. 16, 2022

(54) VEHICLE LAMP

(71) Applicant: Ichikoh Industries, Ltd., Isehara (JP)

(72) Inventors: Kazunori Iwasaki, Isehara (JP); Yasuhiro Okubo, Isehara (JP); Chiharu Sasaki, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 17/279,764

(22) PCT Filed: Sep. 25, 2019

(86) PCT No.: PCT/JP2019/037702
§ 371 (c)(1),
(2) Date: Mar. 25, 2021

(87) PCT Pub. No.: WO2020/067213
PCT Pub. Date: Apr. 2, 2020

(65) Prior Publication Data
US 2022/0034472 A1 Feb. 3, 2022

(30) Foreign Application Priority Data
Sep. 28, 2018 (JP) .............................. JP2018-183822

(51) Int. Cl.
*F21S 41/00* (2018.01)
*F21S 41/675* (2018.01)
(Continued)

(52) U.S. Cl.
CPC ............ *F21S 41/675* (2018.01); *B60Q 1/068* (2013.01); *F21S 41/285* (2018.01); *F21V 29/70* (2015.01)

(58) Field of Classification Search
CPC ........ B60Q 1/068; F21S 41/675; F21S 41/285
See application file for complete search history.

(56) References Cited

U.S. PATENT DOCUMENTS

2017/0130924 A1   5/2017  Kawai et al.
2017/0138555 A1*  5/2017  Hirasawa ................ F21S 41/25
                         (Continued)

FOREIGN PATENT DOCUMENTS

JP       2008-117561 A     5/2008
JP       2009-224039 A    10/2009
                         (Continued)

OTHER PUBLICATIONS

International Search report dated Oct. 29, 2019 in PCT/JP2019/037702 filed Sep. 25, 2019, 2 pages.

*Primary Examiner* — Gerald J Sufleta, II
(74) *Attorney, Agent, or Firm* — Oblon, McClelland, Maier & Neustadt, L.L.P.

(57) ABSTRACT

A vehicle lamp includes a mirror, a plurality of light-emitting elements, and a lens. The mirror is capable of rotating a mirror surface around a rotary axis in a vertical direction. The mirror surface extends along the rotary axis. The light-emitting elements are arranged on a lateral side more than the mirror in a vehicle width direction. The lens irradiates a range wider than the mirror with light from the light-emitting elements. The light-emitting elements are disposed apart from each other such that light distribution images of the light reflected by the mirror surface are aligned along the vehicle width direction. The mirror rotates to combine the adjacent light distribution images and form a main light distribution pattern.

7 Claims, 8 Drawing Sheets

(51) Int. Cl.
    *F21S 41/20*     (2018.01)
    *B60Q 1/068*     (2006.01)
    *F21V 29/70*     (2015.01)

(56) References Cited

U.S. PATENT DOCUMENTS

| | | | |
|---|---|---|---|
| 2018/0112843 A1* | 4/2018 | Sone | F21S 41/36 |
| 2018/0112845 A1 | 4/2018 | Tanaka et al. | |
| 2018/0149327 A1* | 5/2018 | Hechtfischer | G02B 27/0927 |
| 2018/0156414 A1* | 6/2018 | Hoshino | F21S 41/14 |
| 2018/0335192 A1* | 11/2018 | Tanaka | F21S 43/40 |
| 2019/0009705 A1* | 1/2019 | Tanaka | F21S 41/192 |
| 2020/0263850 A1* | 8/2020 | Kawaguchi | G02B 26/101 |
| 2021/0114678 A1* | 4/2021 | Harada | B62J 6/023 |

FOREIGN PATENT DOCUMENTS

| | | |
|---|---|---|
| JP | 2012-119219 A | 6/2012 |
| JP | 2018-73485 A | 5/2018 |
| WO | WO 2016/013447 A1 | 1/2016 |

\* cited by examiner

VEHICLE LAMP

TECHNICAL FIELD

The present invention relates to a vehicle lamp.

BACKGROUND ART

Patent Literature 1 discloses a vehicle headlight (hereinafter also referred to as a vehicle lamp) including a light source, a mirror, a shaping optical system, and a scanning actuator. The light source includes a plurality of light-emitting elements in order to be able to illuminate a wide range in front of the vehicle with a relatively small number of light-emitting elements and to change the irradiation range and illuminance distribution of a light distribution pattern in various ways depending on the surrounding environment and road conditions. The mirror reflects the light emitted by the light source in front of the vehicle. The shaping optical system shapes the light emitted from the light source in accordance with the size of the mirror. The scanning actuator rotates the mirror back and forth to scan the illumination region in front of the vehicle with light reflected by the mirror.

Specifically, the light-emitting elements are arranged in direct contact with each other so as to form a light-emitting region corresponding to the width of the irradiation region on the screen in the vertical direction, and a light distribution pattern is formed in the irradiation area by scanning the irradiation region from one end to the other end in the horizontal direction by the mirror rotating the light-emitting region.

Patent Literature 1 describes that a plano-convex lens serving as a shaping optical system shapes the light emitted from the light source in accordance with the size of the mirror, so that the light of the light-emitting elements can be effectively used to brighten the reflected light of the mirror.

CITATION LIST

Patent Literature

PTL 1: Japanese Unexamined Patent Publication No. 2009-224039

SUMMARY OF THE INVENTION

Problems to be Solved by the Invention

In Patent Literature 1, in order to illuminate a wide area in front of the vehicle with a relatively small number of light-emitting elements, the light-emitting elements are disposed adjacent to each other so as to be in direct contact with each other, to form a light-emitting region that merely covers the width of the irradiation region in the vertical direction. The light-emitting region is scanned from one end in the horizontal direction to the other end with the mirror.

For this reason, the mirror rotates at a large rotary angle so as to scan the light-emitting region from one end of the irradiation region to the other end in the horizontal direction. Since the scanning needs to be repeated before the afterimage of the light-emitting region disappears, it is necessary to use a mirror having a high rotational speed.

There is a problem in that a mirror capable of controlling a large rotary angle range at high speed tends to be expensive, and the difficulty of control is high.

Patent Literature 1 also has a problem in that the light distribution pattern formed by the rotation of the mirror appears on the upper side toward the edge of the irradiation region in the vertical direction because the light source is disposed on the lower side in the vertical direction, and the mirror surface of the mirror that reflects the light tilts diagonally forward and downward in order to receive the light from the light source and emit the light to the front of the vehicle.

An object of the disclosure, in view of such circumstances, is to provide a vehicle lamp that is capable of suppressing the rotary angle of the mirror and suppressing the appearance of distribution light on the upper side in the vertical direction at the edge of an irradiation region.

Means for Solving the Problem

According to one aspect of the disclosure, a vehicle lamp includes:

a mirror that is capable of rotating a mirror surface around a rotary axis in a vertical direction, the mirror surface extending along the rotary axis;

a plurality of light-emitting elements arranged on a lateral side more than the mirror in a vehicle width direction; and a lens that irradiates a range wider than the mirror with light from the light-emitting elements, wherein, the light-emitting elements are disposed apart from each other such that light distribution images of the light reflected by the mirror surface are aligned along the vehicle width direction, and the mirror rotates to combine the adjacent light distribution images and form a main light distribution pattern.

Effect of the Invention

According to the present disclosure, it is possible to provide a vehicle lamp capable of suppressing the rotary angle of the mirror and suppressing the appearance of distribution light on the upper side in the vertical direction at the edge of an irradiation region.

MODE FOR CARRYING OUT THE INVENTION

Embodiments will now be described with reference to the accompanying drawings.

Note that the same numbers or reference signs denote the same elements throughout the description of the embodiments.

In the embodiments and drawings, the terms "front" and "rear" respectively refer to a "forward traveling direction" and a "backward traveling direction" of a vehicle 102, and the terms "top", "bottom", "left", and "right" refer to directions as seen from the driver of the vehicle 102, unless otherwise specified.

Note that the terms "top" and "bottom" also respectively refer to the "top" and the "bottom" in the vertical direction, and the terms "left" and "right" also respectively refer to the "left" and "right" in the horizontal direction.

First Embodiment

Figure 1:
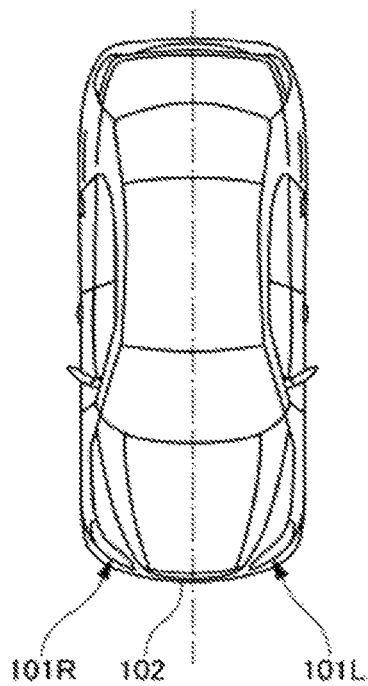
FIG. 1 is a plan view of a vehicle including vehicle lamps of a first embodiment.

FIG. 1 is a plan view of a vehicle 102 including vehicle lamps of a first embodiment.

As illustrated in FIG. 1, the vehicle lamps of the embodiment are vehicle headlights (101L, 101R) disposed on the front of the vehicle 102 on the left and right sides, and, hereinafter, are simply referred to as vehicle lamps.

A vehicle lamp of the present embodiment includes a housing (not illustrated) opened on the front side of the vehicle and an outer lens (not illustrated) attached to the housing so as to cover the opening. The vehicle lamp further includes a lamp unit 1 (see FIGS. 2 and 3), etc., disposed in a lighting chamber composed of the housing and the outer lens.

Figure 2:
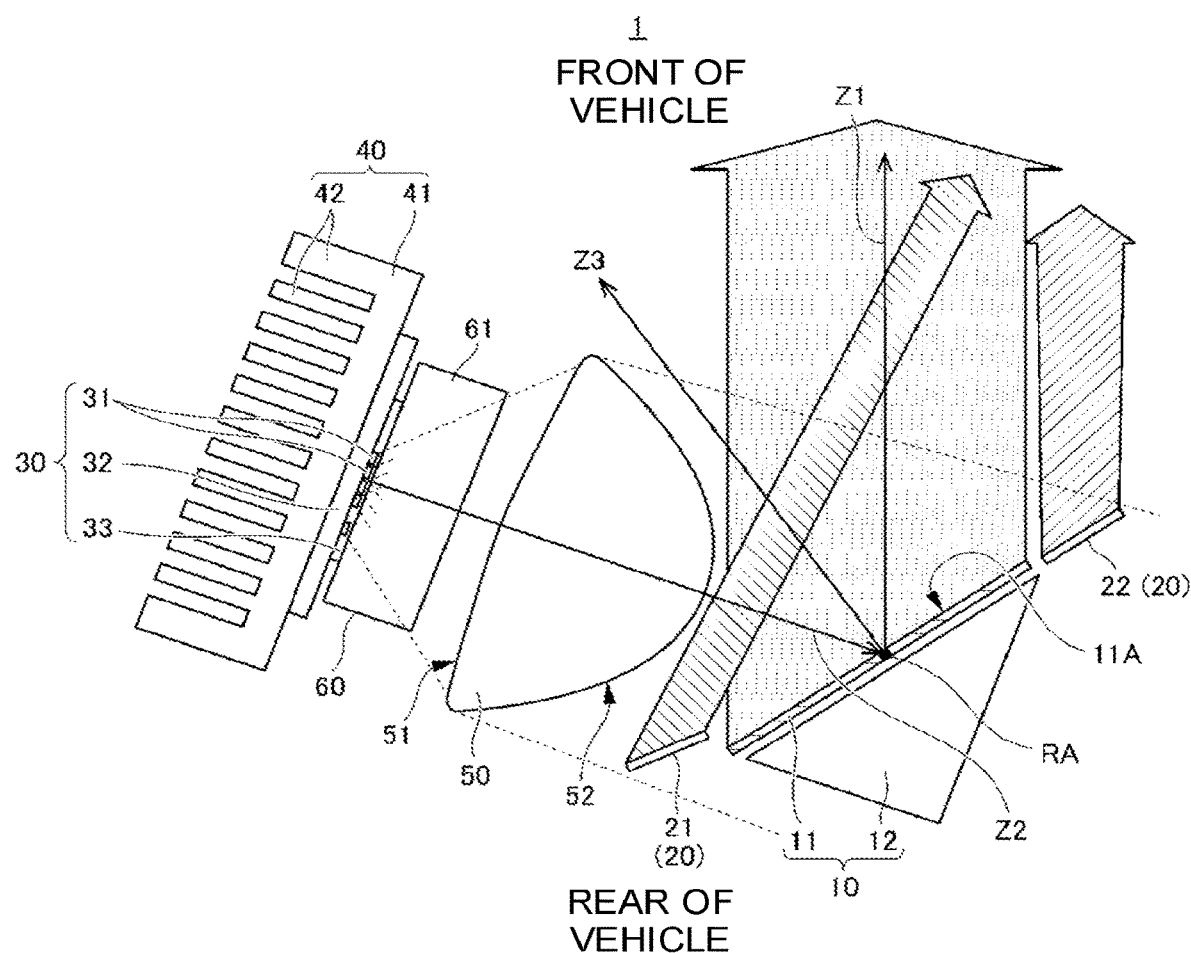
FIG. 2 is a plan view of the lamp unit of the first embodiment as viewed from above in the vertical direction.
Figure 3:
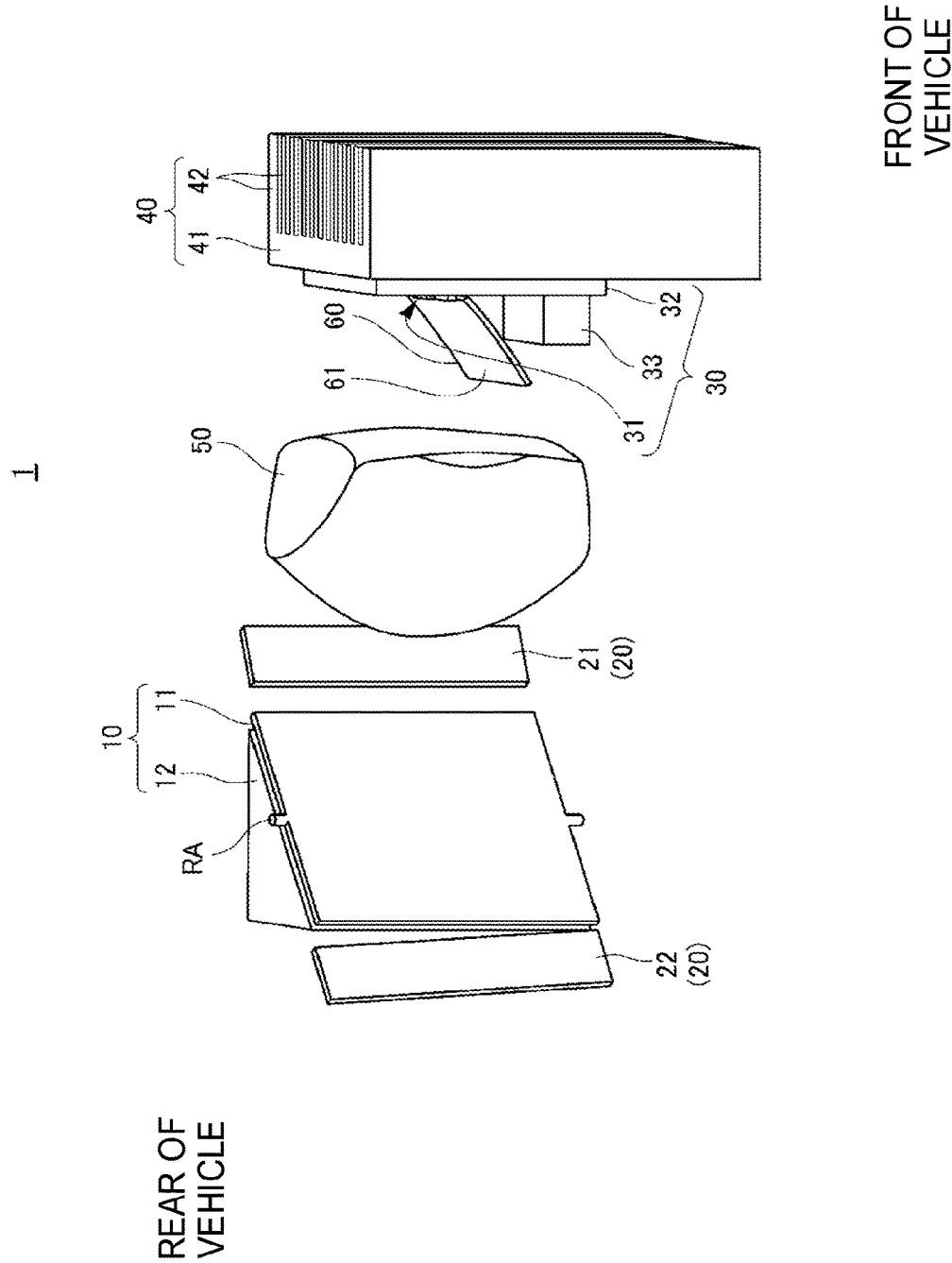
FIG. 3 is a perspective view of the lamp unit of the first embodiment as viewed from the inside in the vehicle width direction on the front side of the vehicle.

FIG. 2 is a plan view of a lamp unit 1 of the present embodiment as viewed from above in the vertical direction. FIG. 3 is a perspective view of the lamp unit 1 of the present embodiment as viewed from the inside in the vehicle width direction on the front side of the vehicle.

Note that in FIGS. 2 and 3, only the main components of the lamp unit 1 are illustrated.

In FIG. 2, the direction and range of the light reflected by a mirror surface 11A, which will be described later, and illuminating the front side of the vehicle are indicated by thick arrows. Similarly, the direction and range of the light reflected by reflectors 20 (first reflector 21, second reflector 22) and illuminating the front side of the vehicle are indicated by thick arrows.

As illustrated in FIGS. 2 and 3, the lamp unit 1 includes a mirror 10; at least one of the reflectors 20 (first reflector 21, second reflector 22) disposed on the outer side more than the mirror 10 in the vehicle width direction; a light source 30 including a plurality of light-emitting elements 31 disposed laterally in the vehicle width direction with respect to the mirror 10; a heatsink 40 in which the light source 30 is disposed; a lens 50 that emits the light from the light-emitting elements 31 toward the mirror 10 and the reflectors 20; and a light-distribution-image expanding unit 60 that reflects the light from the light-emitting elements 31 upward and spreads light distribution images formed by the light of the light-emitting elements 31 in the vertical direction.

(Mirror 10)

As will be described later, the mirror 10 is a member for combining light distribution images formed by light from the respective light-emitting elements 31 to form a main light distribution pattern. The mirror 10 includes a mirror portion 11 and a rotary actuator 12. The rotary actuator 12 rotatably supports a rotary axis RA of the mirror portion 11 along the vertical direction (the support mechanism is not illustrated) and rotates the mirror portion 11 around the rotary axis RA.

Note that the details of how the main light distribution pattern is formed by the mirror 10 will be explained later.

The structure of the rotary actuator 12 for rotating the mirror portion 11 does not need to be particularly limited and may be a general structure.

The mirror surface 11A, which is formed as a substantially flat surface and serves as a reflective surface for reflecting the light from the light-emitting elements 31 of the mirror portion 11, is disposed along the rotary axis RA. By the rotation of the mirror portion 11, the mirror surface 11A disposed along the rotary axis RA can be rotated around the rotary axis RA in the vertical direction.

Since the mirror surface 11A is a surface disposed along the vertical direction, scanning by the light reflected by the mirror surface 11A due to the rotation of the mirror portion 11 is performed only in the horizontal direction.

Therefore, a phenomenon does not occur in which the light distribution is directed farther upward farther outward from the irradiation range that occurs when scanning is performed with the mirror surface tilted diagonally forward and downward, and the light distribution pattern does not appear in the vertically upward area farther toward the outer side of the light distribution pattern.

Note that FIGS. 2 and 3 illustrate a state in which the mirror portion 11 of the mirror 10 is positioned at the position of the initial state in which the mirror portion 11 is not rotating.

As described above, without the mirror surface 11A being tilted forward and downward, the mirror 10 is disposed such that the mirror portion 11 tilts laterally in the vehicle width direction toward the side of the light source 30 relative to the lamp optical axis Z1 in the initial state in which the mirror portion 11 is not rotating, so that the mirror surface 11A is capable of receiving the light from the light-emitting elements 31.

(Reflectors 20)

As will be described later, the reflectors 20 are members provided for forming a sub-light distribution pattern added to a main light distribution pattern formed by the mirror 10 combining multiple light distribution images. In the present embodiment, the reflectors 20 include a first reflector 21 disposed on one lateral outer side of the mirror 10 and a second reflector 22 arranged on the other lateral outer side of the mirror 10.

Note that the details of how the sub-light distribution pattern is formed by the reflectors 20 will be explained later.

(Light Source 30)

The light source 30 includes a plurality of light-emitting elements 31, a substrate 32 on which the light-emitting elements 31 are disposed, and a connector 33 disposed on the substrate 32 for receiving electric power or the like to be supplied to the light-emitting elements 31 from an external unit.

The light-emitting elements 31 are disposed on the substrate 32 apart from each other so that the light distribution images of the light of the light-emitting elements 31 reflected by the mirror surface 11A are aligned along the vehicle width direction.

Note that, in this embodiment, five light-emitting elements 31 are provided. However, the number of light-emitting elements 31 does not have to be limited to five. In this embodiment, LED chips are used as the light-emitting elements 31. However, the light-emitting elements 31 do not have to be limited to the LED chips, and alternatively may be laser diode (LD) chips or the like.

The light-emitting elements 31 do not need to be arranged equidistantly to each other so that the distances between the adjacent light-emitting elements 31 are equal. As illustrated in FIG. 2, at least some of the light-emitting elements 31 may be disposed such that the distances between these light-emitting elements 31 are different.

Note that the light source 30 is disposed on the lateral side in the vehicle width direction that is on the inner side in the vehicle width direction more than the mirror 10 and the reflectors 20, such that the light from the light-emitting elements 31 reflected by the mirror 10 and the reflectors 20 is not blocked, and such that the light from the light-emitting elements 31 is emitted diagonally rearward on the outer side in the vehicle width direction.

(Heatsink 40)

The heatsink 40 is a member for cooling the light source 30. The heatsink 40 includes a base portion 41 on which the substrate 32 of the light source 30 is disposed, and a plurality of radiating fins 42 disposed on the back surface of the base portion 41 remote from the side on which the light source 30 is disposed. In the present embodiment, a heatsink 40 made of aluminum die-cast, in which the base portion 41 and the radiating fins 42 are integrally molded, is used.

However, the heatsink 40 does not have to be limited to an aluminum die-cast product, and may be made of a metal or resin having high heat dissipation.

(Lens 50)

The lens 50 has an incident surface 51 on which the light from the light-emitting elements 31 is incident, and an output surface 52 from which the incident light is emitted. In the present embodiment, the lens 50 is a biconvex lens in which the incident surface 51 and the output surface 52 are both formed by free curved surfaces that are curved in the direction of protruding outward from the lens 50.

Note that, as illustrated in FIG. 2, the lens 50 is disposed such that a lens optical axis Z2 is positioned on the rotary axis RA of the mirror portion 11, and such that the angle formed between the lens optical axis Z2 and the lamp optical axis Z1 is acute. However, in other embodiments, the lens 50 may be disposed such that the lens optical axis Z2 is offset relative to the rotary axis RA of the mirror portion 11.

In FIG. 2, the entire range of light emitted by the plurality of light-emitting elements 31 and the entire range of light emitted from the lens 50 are schematically shown by dotted lines. As illustrated in FIG. 2, the lens 50 emits the light from the light-emitting elements 31 to a range wider than that of the mirror 10 in order to irradiate the reflectors 20 (first reflector 21, second reflector 22) with the light.

Note that FIGS. 2 and 3 illustrate only the portion of the lens 50 that performs optical control. However, for example, the lens 50 has a flange portion integrally formed on one or the other lateral side of the main portion that performs optical control illustrated in FIGS. 2 and 3. The flange portion is held by a lens holder (not illustrated) attached to the heatsink 40 so that the lens 50 is disposed at a predetermined position closer to the mirror 10 and the reflectors 20 than the light source 30.

(Light-Distribution-Image Expanding Unit 60)

The light-distribution-image expanding unit 60 is disposed vertically below the light-emitting elements 31, and has a reflective surface 61 formed by a free curved surface extending downward toward the lens 50.

The light-distribution-image expanding unit 60 serves to spread the light distribution image formed by the light from the plurality of light-emitting elements 31 in the vertical direction by causing a portion of the light emitted vertically downward from the light-emitting elements 31 to be reflected by the reflective surface 61 to a vertically upward direction (also referred to as upper side) onto the lens 50.

In this way, by expanding each light distribution image in the vertical direction by the light-distribution-image expanding unit 60, the vertical width of the light distribution images can be made closer to the vertical width required in the vertical direction of the main light distribution pattern without arranging the light-emitting elements 31 in multiple stages in the vertical direction.

Although the fixed structure is not illustrated in FIGS. 2 and 3, the light-distribution-image expanding unit 60 may be fixed to the substrate 32 of the light source 30, and may be fixed to the base portion 41 of the heatsink 40 together with the substrate 32.

A light distribution pattern formed by the lamp unit 1 having the above-described configuration will now be described mainly with reference to FIGS. 2, 4, and 5.

Figure 4:
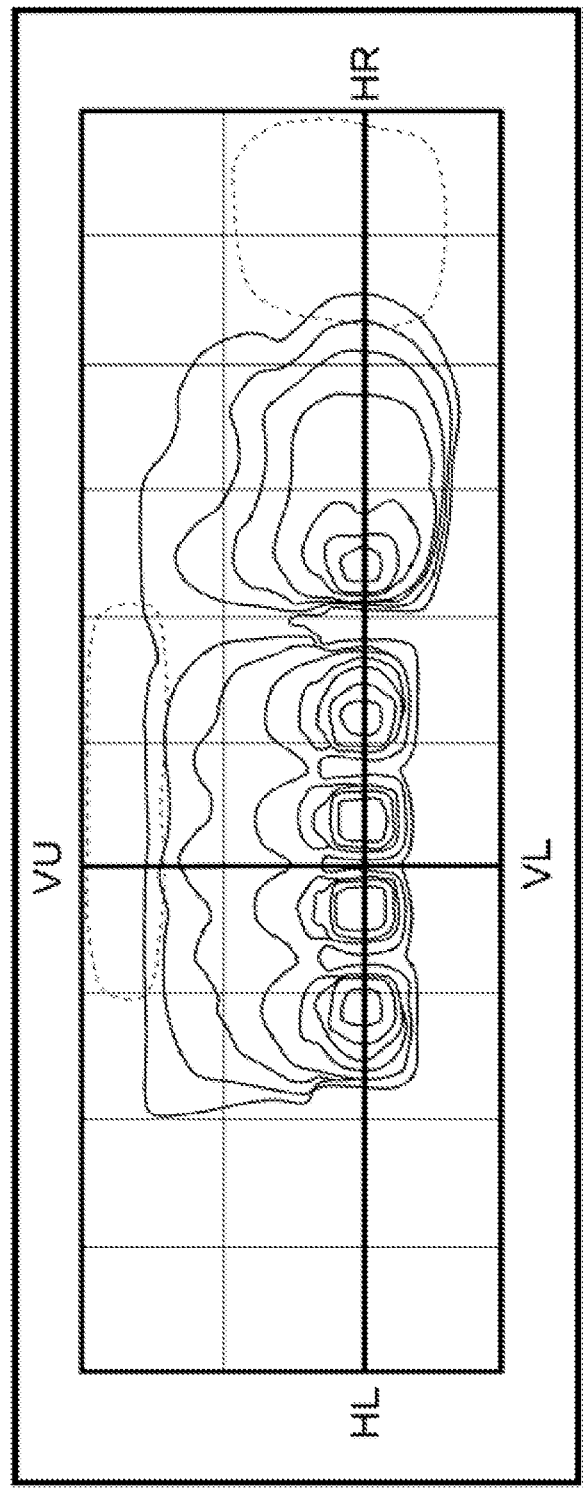
FIG. 4 is a diagram for explaining a light distribution pattern on a screen in an initial state in which a mirror portion of the first embodiment is not rotating.

FIG. 4 is a diagram for explaining a light distribution pattern on a screen in an initial state in which the mirror portion 11 is not rotating. FIG. 5 is a diagram for explaining a light distribution pattern on a screen when the mirror portion 11 is rotating.

Figure 5:
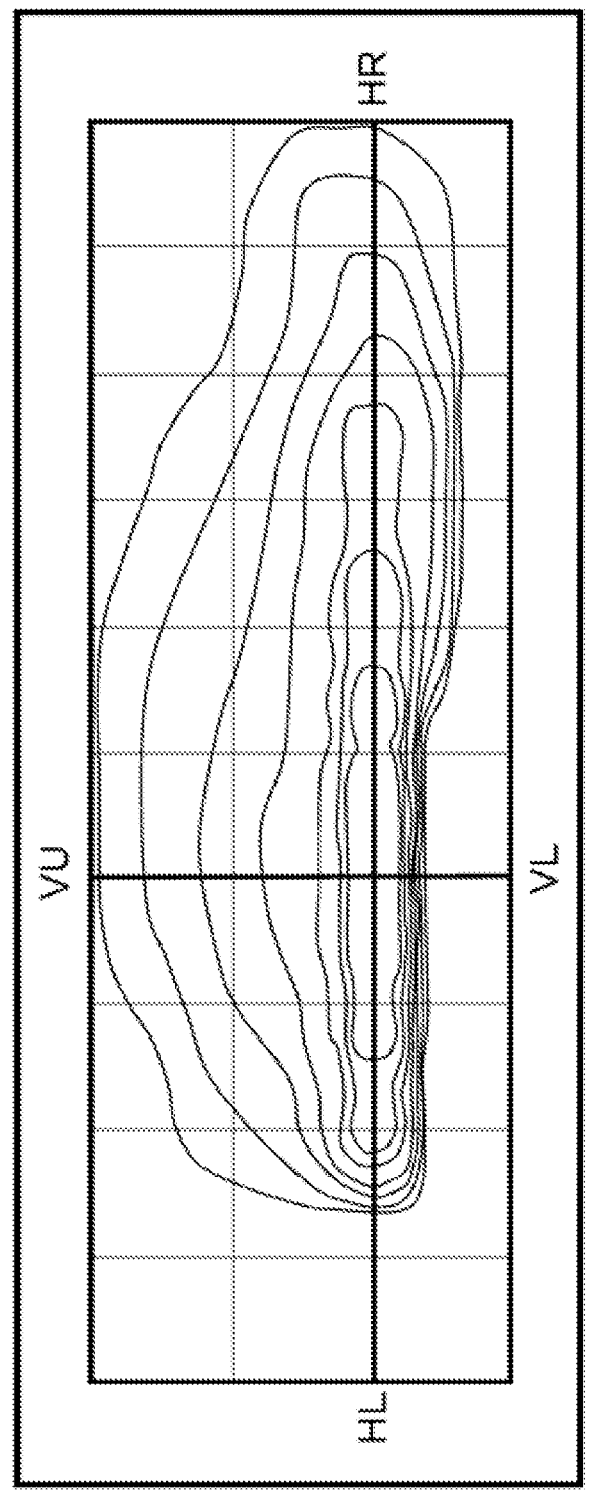
FIG. 5 is a diagram for explaining a light distribution pattern on a screen when the mirror portion of the first embodiment is rotating.

Note that, in FIGS. 4 and 5, the VU-VL line is a vertical reference line on the screen, and the HL-HR line is a horizontal reference line on the screen. The scale lines provided in the horizontal and vertical directions are scale lines in 5° increments. The same applies to the following figures in the drawings for explaining the light distribution pattern on the screen.

In FIG. 4, the isoluminosity lines of the light distribution image by the light reflected by the mirror surface 11A is shown by solid lines, and the ranges of the light distribution images by the light reflected by the reflectors 20 (first reflector 21, second reflector 22) is shown by the dotted lines. In FIG. 5, the main light distribution pattern formed by combining both the light reflected by the mirror surface 11A and the light reflected by the reflectors 20 (first reflector 21, second reflector 22) is shown by isoluminous lines.

The light-emitting elements 31 are arranged apart from each other as described above so that the light distribution images of the light from the light-emitting elements 31 reflected by the mirror surface 11A appears in such a manner to cover the horizontal direction of the main light distribution pattern as much as possible. Therefore, when the mirror 10 (mirror surface 11A) is not rotating, as illustrated in FIG. 4, the light distribution images formed by the light from the respective light-emitting elements 31 appear on the screen in a state in which the high-intensity bands are disposed apart from each other.

The present embodiment describes a case in which the main light distribution pattern is a high-beam light distribution pattern. In the case of the high-beam light distribution pattern, it is preferable that the light distribution range reside up to about 10° above in the vertical direction. However, in a light distribution image reflected by the mirror 10, the light does not reach the range of 10° in the vertical direction.

Furthermore, it is preferable that the light reach slightly farther (for example, approximately 5° to 10°) to the outer side in the vehicle width direction on the outer side in the horizontal direction (right side in FIG. 4), which is the outer side in the vehicle width direction.

Accordingly, one of the first reflector 21 and the second reflector 22 reflects light so as to form a sub-light distribution pattern added to the outer side of the main light distribution pattern in the vehicle width direction, and the other one of the first reflector 21 and the second reflector 22 reflects light so as to form a sub-light distribution pattern added to the upper side in the vertical direction of the main light distribution pattern.

Specifically, in the present embodiment, as illustrated in FIG. 2, the first reflector 21 reflects the light reflected by the mirror portion 11 to the outer side in the horizontal direction, which is the outer side in the vehicle width direction, and the second reflector 22 reflects the light reflected by the mirror portion 11 upward in the vertical direction.

Note that, when the light reflected by the second reflector 22 reaches the screen, the light should be positioned above the light reflected by the mirror surface 11A at a position including the vertical reference line (see the VU-VL line) illustrated in FIG. 4, and thus, the light reflected by the second reflector 22 only needs to be reflected slightly inward. For this reason, FIG. 2 illustrates the light reflected by the second reflector 22 as to be reflected substantially parallel to the light reflected by the mirror surface 11A. However, in reality, the light reflected by the second reflector 22 is a group of rays that are directly slightly inward.

When the mirror 10 (the mirror portion 11) rotates so as to combine the light distribution images illustrated in FIG. 4 to form the main light distribution pattern, the satisfactory high-beam light distribution pattern illustrated in FIG. 5 can be formed.

Specifically, with reference to FIG. 2, an axis Z3 extending from the rotary axis RA of the mirror portion 11 to the normal direction of the mirror surface 11A is also drawn in FIG. 2, but the mirror 10 (the mirror portion 11) rotates ±2.5° relative to the axis Z3 so as to combine adjacent light distribution images to form a main light distribution pattern, and the mirror surface 11A rotates ±2.5° from the non-rotating state.

By performing such rotation, the light distribution images are combined, and a satisfactory main light distribution pattern is formed as the high-beam light distribution pattern illustrated in FIG. 5.

As described above, in the present embodiment, it is sufficient that the mirror 10 (mirror portion 11) be rotatable within the range in which the light distribution images can be combined. Therefore, it is sufficient that the mirror portion 11 be rotatable within a range of ±5° relative to the axis Z3, and the mirror surface 11A be rotatable within a range of ±5°. For this reason, the rotation angle of the mirror 10 can be suppressed to an extremely small angle.

In particular, since the light is incident diagonally on the mirror surface 11A, the light reflected by the mirror surface 11A is not reflected within the same rotary range as that in the conventional technique but is incident on an angular range that is twice the rotary angle. Therefore, the rotary angle required to combine the light distribution images can be kept extremely small.

In recent years, it has been required to perform adaptive driving beam (ADB) control that changes the high-beam light distribution pattern in order to suppress glare light to a preceding vehicle, an oncoming vehicle, etc., while maintaining the forward visibility of the driver.

Accordingly, it is preferred that a control unit (not illustrated) that drives the rotary actuator 12 and turns on and off the light-emitting elements 31 perform ADB control.

Figure 6:
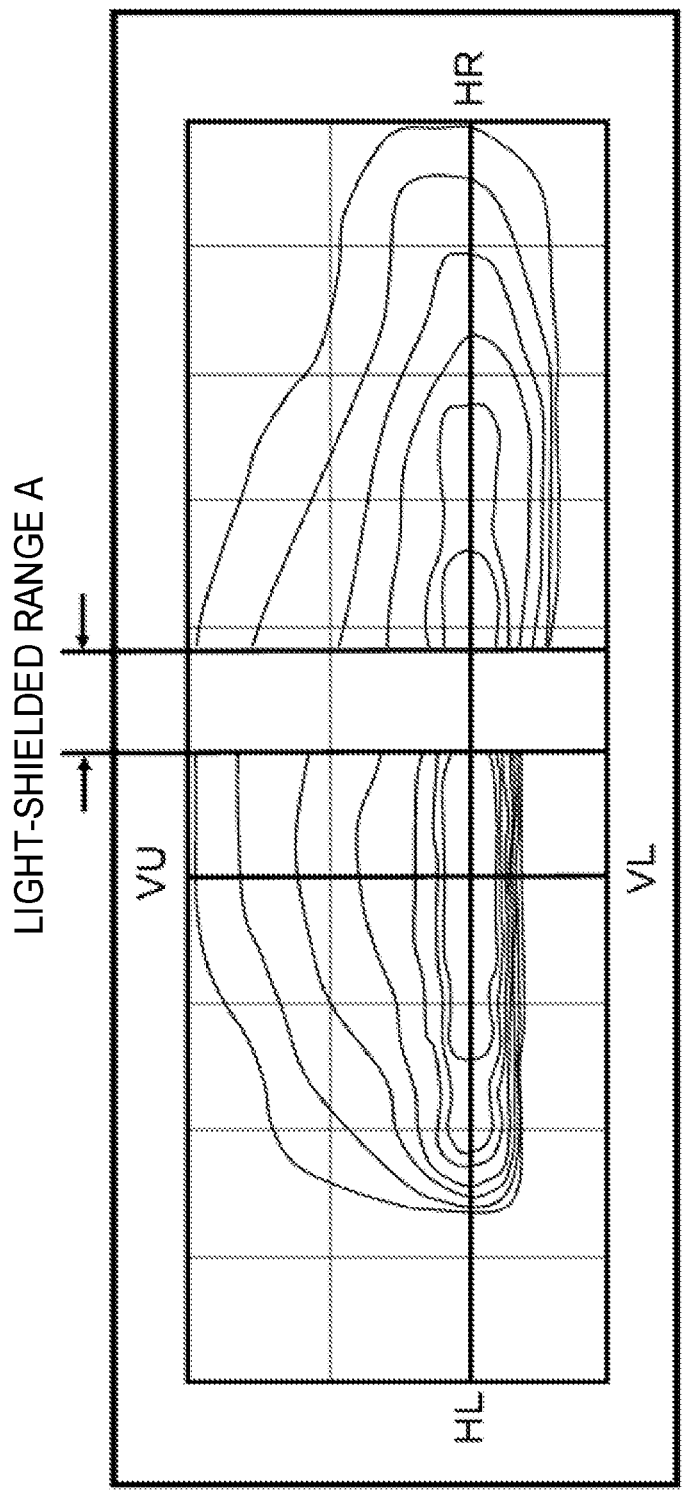
FIG. 6 is a diagram for explaining ADB control of the first embodiment.

Specifically, with reference to FIG. 6, which is a diagram for explaining ADB control, in ADB control, only the region of the high-beam light distribution pattern in which a preceding vehicle exists will be controlled as a light-shielded range A in order to suppress glare light emitted to the preceding vehicle (not illustrated).

Therefore, the control unit (not illustrated) controls the driving of the light-emitting elements 31 so that the light-shielded range A is not irradiated with light on the basis of the information on the rotary angle centered around the rotary axis RA and the information on the light-shielded range A set in the main light distribution pattern.

That is, the control unit performs control to turn on the light-emitting elements 31 that radiate light onto the light-shielded range A among all light-emitting elements 31 until immediately before the light-shielded range A is irradiated with light on the basis of the information on the rotary angle, and to turn off the light-emitting elements 31 when an area inward from the boundary line of the light-shielded range A is irradiated with light.

Second Embodiment

The lamp unit 1 of the second embodiment will now be described with reference to FIGS. 7 and 8.

Since the specific configuration of the second embodiment is similar to that of the first embodiment, the differences will be mainly described below, and a description of the same points may be omitted.

Figure 7:
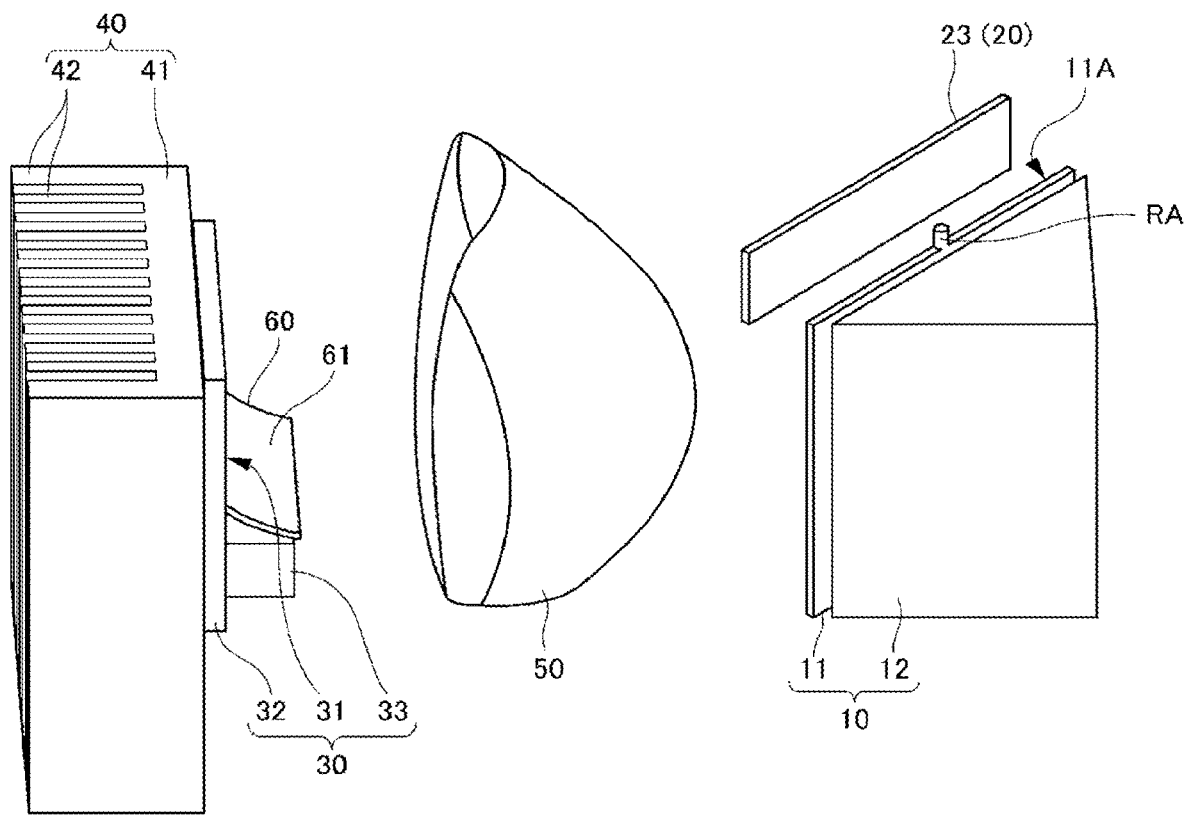
FIG. 7 is a perspective view of a lamp unit of a second embodiment.

FIG. 7 is a perspective view of the lamp unit 1 of the present embodiment. FIG. 8 is a plan view of the lamp unit 1 of the present embodiment as viewed from the side of the lens 50.

Figure 8:
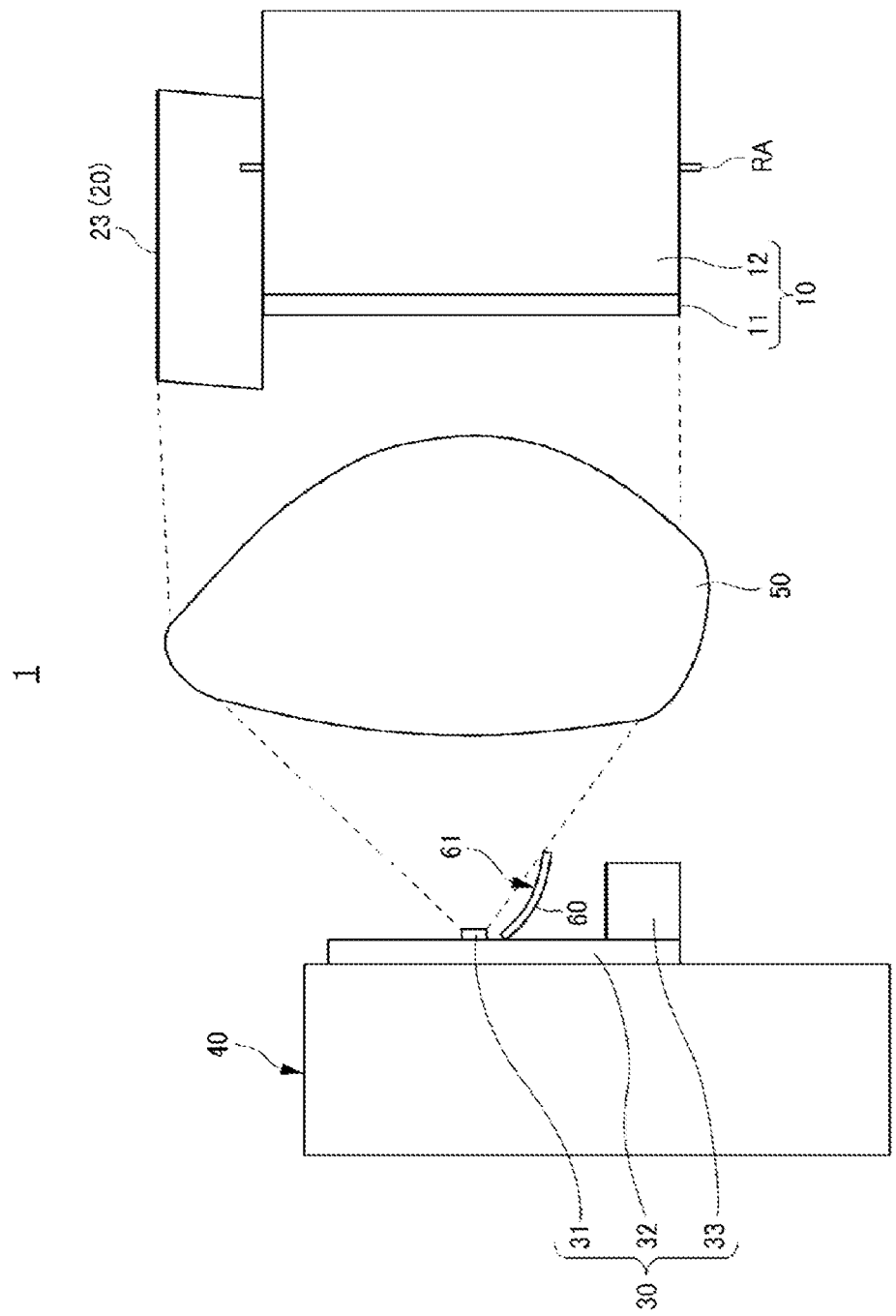
FIG. 8 is a plan view of the lamp unit of the second embodiment as viewed from the side of a lens.

Note that in FIGS. 7 and 8, only the main components of the lamp unit 1 are illustrated, as in FIGS. 2 and 3.

In FIG. 8, as in FIG. 2, the entire range of light emitted by the plurality of light-emitting elements 31 and the entire range of light emitted from the lens 50 are schematically shown by dotted lines.

As illustrated in FIGS. 7 and 8, in the present embodiment, a reflector 20 is disposed on the upper side of the mirror 10 in the vertical direction; an upper reflector 23 is provided to form a sub-light distribution pattern that is added to the upper side of the main light distribution pattern in the vertical direction; and the first reflector 21 and the second reflector 22 of the first embodiment are omitted.

That is, the upper reflector 23 is provided as a configuration corresponding to the second reflector 22, and, for example, the rotary angle of the mirror 10 (the mirror portion 11) is made slightly larger than that of the first embodiment. In this way, the horizontal light distribution width required for the main light distribution pattern can be obtained even without the first reflector 21 being provided and the first reflector 21 may be omitted.

In the present embodiment as illustrated in FIG. 8, similar to the first embodiment, the lens 50 can obtain a main light distribution pattern similar to that illustrated in FIG. 5 by emitting the light from the light-emitting elements 31 onto a range wider than the mirror 10 and rotating the mirror 10 (the mirror portion 11) to also irradiate the upper reflector 23, which is the reflector 20, with the light.

Although specific embodiments have been described above, the present invention is not limited to the above embodiments.

For example, the reflector 20 may include the first reflector 21 and the second reflectors 22 described in the first embodiment, and may also include the upper reflector 23 described in the second embodiment. Alternatively, the reflector 20 may be omitted.

In such a case, the first reflector 21 and the second reflector 22 may form sub-light distribution patterns added to the main light distribution pattern, as described in the first embodiment, and the upper reflector 23 may form, for example, a sub-light distribution pattern that is an overhead light distribution pattern disposed on the upper side of the main light distribution pattern in the vertical direction.

In the first embodiment, as in the second embodiment, the horizontal light distribution width required for the main light distribution pattern may be obtained by the rotary angle of the mirror 10 (the mirror portion 11), and the first reflector 21 may be used to form a sub-light distribution pattern that is an overhead light distribution pattern provided on the upper side of the main light distribution pattern in the vertical direction.

As described above, the present invention is not limited to the above-described embodiments, and modifications and improvements made without departing from the technical idea are also included in the technical scope of the invention. This will be apparent to those skilled in the art from the description of the claims.

DESCRIPTION OF REFERENCE NUMERALS 1 lamp unit
10 mirror
11 mirror portion
11A mirror surface
12 rotary actuator
20 reflector
21 first reflector
22 second reflector
23 upper reflector
30 light source
31 light-emitting element
32 substrate
33 connector
40 heatsink
41 base portion
42 radiating fin
50 lens
51 incident surface
52 output surface
60 light-distribution-image expanding unit
61 reflective surface
A light-shielded range
Z1 lamp optical axis
Z2 lens optical axis
Z3 axis
101L, 101R vehicle head lights
102 vehicle

The invention claimed is:

1. A vehicle lamp comprising:
a mirror that is capable of rotating a mirror surface around a rotary axis in a vertical direction, the mirror surface extending along the rotary axis;
a plurality of light-emitting elements arranged on a lateral side of a vehicle width direction more than the mirror;
a lens that irradiates a range wider than the mirror with light from the light-emitting elements; and
at least one reflector disposed on an outer side of the mirror, wherein,
the light-emitting elements are disposed apart from each other such that light distribution images of the light reflected by the mirror surface are aligned along the vehicle width direction,
the mirror rotates to combine the adjacent light distribution images and form a main light distribution pattern,
the lens irradiates a range wider than the mirror with the light from the light-emitting elements to irradiate the reflector with light,
the reflector forms a sub-light distribution pattern,
the reflector comprises:
a first reflector disposed on one lateral outer side of the mirror; and
a second reflector disposed on the other lateral outer side of the mirror,
one of the first reflector and the second reflector forms the sub-light distribution pattern added to the outer side of the main light distribution pattern in the vehicle width direction, and
the other one of the first reflector and the second reflector forms the sub-light distribution pattern above the main light distribution pattern in the vertical direction.

2. The vehicle lamp according to claim 1, further comprising:
a light-distribution-image expanding unit disposed below the light-emitting elements in the vertical direction, the light-distribution-image expanding unit reflecting upward the light from the light-emitting elements and spreading the light distribution images in the vertical direction.

3. The vehicle lamp according to claim 1, wherein the mirror is capable of rotating the mirror surface within a range of ±5° from a non-rotating state.

4. The vehicle lamp according to claim 1, further comprising:
a control unit that controls driving of the light-emitting elements in such a manner that a light-shielded range is not irradiated with light, based on information on a rotary angle centered around the rotary axis and information on the light-shielded range set in the main light distribution pattern.

5. The vehicle lamp according to claim 1, wherein the plurality of light-emitting elements are disposed in such a manner that a distance between at least one pair of the light-emitting elements adjacent to each other is different from a distance between any other pair of the light-emitting elements adjacent to each other.

6. The vehicle lamp according to claim 1, wherein the reflector further comprises an upper reflector that is disposed above the mirror in the vertical direction and forms the sub-light distribution pattern above the main light distribution pattern in the vertical direction.

7. The vehicle lamp according to claim 1, wherein the lens is disposed such that a lens optical axis is positioned on a rotary axis of the mirror and an angle formed between the lens optical axis and an optical axis of the vehicle lamp is acute.

* * * * *